United States Patent [19]
Ulanov et al.

[11] Patent Number: 5,392,122
[45] Date of Patent: Feb. 21, 1995

[54] APPARATUS AND METHOD FOR THE DETERMINATION OF GEOMETRICAL DIMENSIONS AND PHYSICAL CHARACTERISTICS OF OBJECTS

[76] Inventors: Mark Ulanov, 1003 Sussex Dr.;
Alexander Zaltz, 3121 Violet La.;
Michael Black, 2817 Crabtree La., all of Northbrook, Ill. 60062

[21] Appl. No.: 590,689

[22] Filed: Oct. 1, 1990

[51] Int. Cl.6 .................. G01B 11/00; G01N 21/00
[52] U.S. Cl. .................. 356/372; 356/375; 356/241; 348/135
[58] Field of Search ........... 356/372, 375, 376, 377, 356/378, 379, 380, 241, 384; 358/107

[56] References Cited

U.S. PATENT DOCUMENTS

| | | | |
|---|---|---|---|
| 4,078,864 | 3/1978 | Howell | 356/379 |
| 4,147,052 | 4/1979 | Tsujiuchi et al. | 356/378 |
| 4,197,012 | 4/1980 | Kerenyi et al. | 356/380 |
| 4,207,594 | 6/1980 | Morris et al. | 356/241 |
| 4,277,168 | 7/1981 | Oku | 356/241 |
| 4,463,600 | 8/1984 | Hobbs et al. | 356/378 |
| 4,493,554 | 1/1985 | Pryor et al. | 356/241 |
| 4,561,776 | 12/1985 | Pryor | 356/372 |
| 4,672,437 | 6/1987 | Casper | 356/241 |
| 4,858,001 | 8/1989 | Milbank et al. | 356/241 |
| 5,146,779 | 9/1992 | Sugimoto et al. | 356/378 |

Primary Examiner—Richard A. Rosenberger
Assistant Examiner—Hoa Q. Pham
Attorney, Agent, or Firm—Y. Judd Azulay

[57] ABSTRACT

A method for accurately determining the dimensions of surfaces of an article, particularly while the article is being machined. Also disclosed are machine tools, lathe and milling machines containing the necessary components to obtain said measurements without the use of additional equipment.

3 Claims, 5 Drawing Sheets

APPARATUS AND METHOD FOR THE DETERMINATION OF GEOMETRICAL DIMENSIONS AND PHYSICAL CHARACTERISTICS OF OBJECTS

BACKGROUND OF THE INVENTION

This invention relates to the determination of geometrical dimensions and physical characteristics of objects as well as viewing and measurement of their limited access areas. More particularly, this invention relates to the inspection and measurement of surfaces without disassembling or otherwise altering the piece parts or other article. Important aspects of the present invention are machine tools comprising the necessary features for viewing and measuring desired portions of an object while it is being mounted within the particular machine tool.

It has been possible for some period of time to examine the interior of items. U.S. Pat. No. 1,775,452 describes an instrument for examining the interior of gun barrels and tubes. In particular borescopes have been long established as instruments for the inspection of bore surfaces in elongate articles. Normally the viewer looks through an eye piece to view the interior of the object. Some borescopes are constructed so as to permit the taking of photographs through the eyepiece. Also the Lenox Instrument Company has proposed a system consisting of a color video minicamera module, a color monitor, a camera adapter for attaching the camera to the eyepiece of a borescope and a borescope. This borescope system does not include equipment or methods for the measurement of the interior surface of an object.

U.S. Pat. No. 4,078,864 also shows the use of a camera to deliver a picture to display a generally inaccessible area. In addition this patent discloses the use of a camera for taking a picture of an object having damage. This patent's main thrust is to a method for measuring a generally inaccessible dimension of an object viewed through an optical viewing tube. It utilizes a method comprising placing a glass reticle having a previously marked unit of length for the focussed distance over a photograph of the object.

SUMMARY OF THE INVENTION

An object of the present invention is a method for the measurement of generally inaccessible areas of articles without damaging the article.

Another object of the present invention is a method for the efficient measurement of internal surfaces of any item.

Another object of the present invention is a machine tool that can provide precision tooling.

Another object of the present invention is a machine tool, presenting machining, viewing and accurate measurement of the dimensions of the machined article.

Another object of this invention is to combine the machining and measuring capabilities into one work center allowing the performance of a workpiece machining, inspection and measurement without removing a part from the machine.

Another object of this invention is to provide a useful arrangement of an electro-optical sensor with the control of the machine tool in order to receive, store and manipulate dimensional data related to a workpiece and tool.

Another object of the present invention is to provide means for setting up a workpiece in a machine tool and for inspecting the workpiece with an electro-optical sensor.

Another object of the present invention is to simplify the setting up and measurement of a workpiece and tool of complex configuration inaccessible by other means of measurement.

Other objects of the present invention will become apparent from the ensuing description.

The present invention provides a method for viewing generally inaccessible areas and accurately measuring dimensions therein. It is particularly useful for viewing and determining the accuracy of machining in inaccessible areas.

The present invention further provides a machine tool, such as a lathe or milling machine, having means for viewing surfaces being machined and determining with accuracy the dimensions of said surfaces.

The present invention relates to a method of using an electro-optical sensor, mounted on any part of the machine tool or apparatus to the machine, in conjunction with the machine control or external position sensing and processing device, for inspection, measurement and setting of workpiece and tools.

In this invention an electro-optical sensor is a non-contact device capable of receiving light from the surface of the workpiece and transforming it into video or other types of signal for determining dimensions, positions or physical characteristics of the part and tools.

In accordance with the first preferred embodiment of the present invention, the electro-optical sensor with the video head is mounted in a tool holder of the machine with a multiple tool coupling, or it can replace a machine tool in the same tool coupling for machines with the single mounting coupling. The light transmitting cable and output video cable are attached to the probe permanently.

In accordance with another preferred embodiment of the present invention, the electro-optical probe can be positioned on the machine permanently and stored in a tool magazine. The light cable and video cable can be connected to the probe at the time it is positioned for measurement.

According to the present invention an electro-optical sensor, light source, electronic character generator, video camera and monitor are mounted on a machine tool. There can also be displayed on the video screen a pre-calibrated linear measuring device so that the visual representation of the surface of the article being machined can be viewed and measured with the machining operation. The sensor probe, light source, video camera, electronic character generator and monitor are integral parts of the machine tool.

According to the present invention, the electro-optical sensor and light source, electronic character generator, video camera and monitor are mounted on the machine tool often on a turret or spindle of the machine tool not being used for machining. This equipment can be mounted on most machine tools, including but not limited to lathes having single or multiple spindles; single or multiple turret lathes; or horizontal or vertical lathes; and milling machines which are either horizonal or vertical; single or multiple spindle and the like.

The present invention is preferably utilized in combination with a machine tool having a plurality of tool couplings so that the sensor can be mounted in a tool coupling other than the one carrying the tool which works on the article being machined. Thus the machine tool can perform the machining and the inspection of the dimensions of the article machined without the need for additional equipment.

While it is advantageous to mount the electro-optical sensor in a tool coupling of the machine, similar results can be achieved when the probe is mounted on a stand alone measuring device such as coordinate measuring machine or other suitable instrument.

In accordance with a preferred embodiment of the present invention, the electro-optical sensor with the video head is mounted on three-axis measuring device with digital readout.

DESCRIPTION OF THE PREFERRED EMBODIMENT

Figure 1:
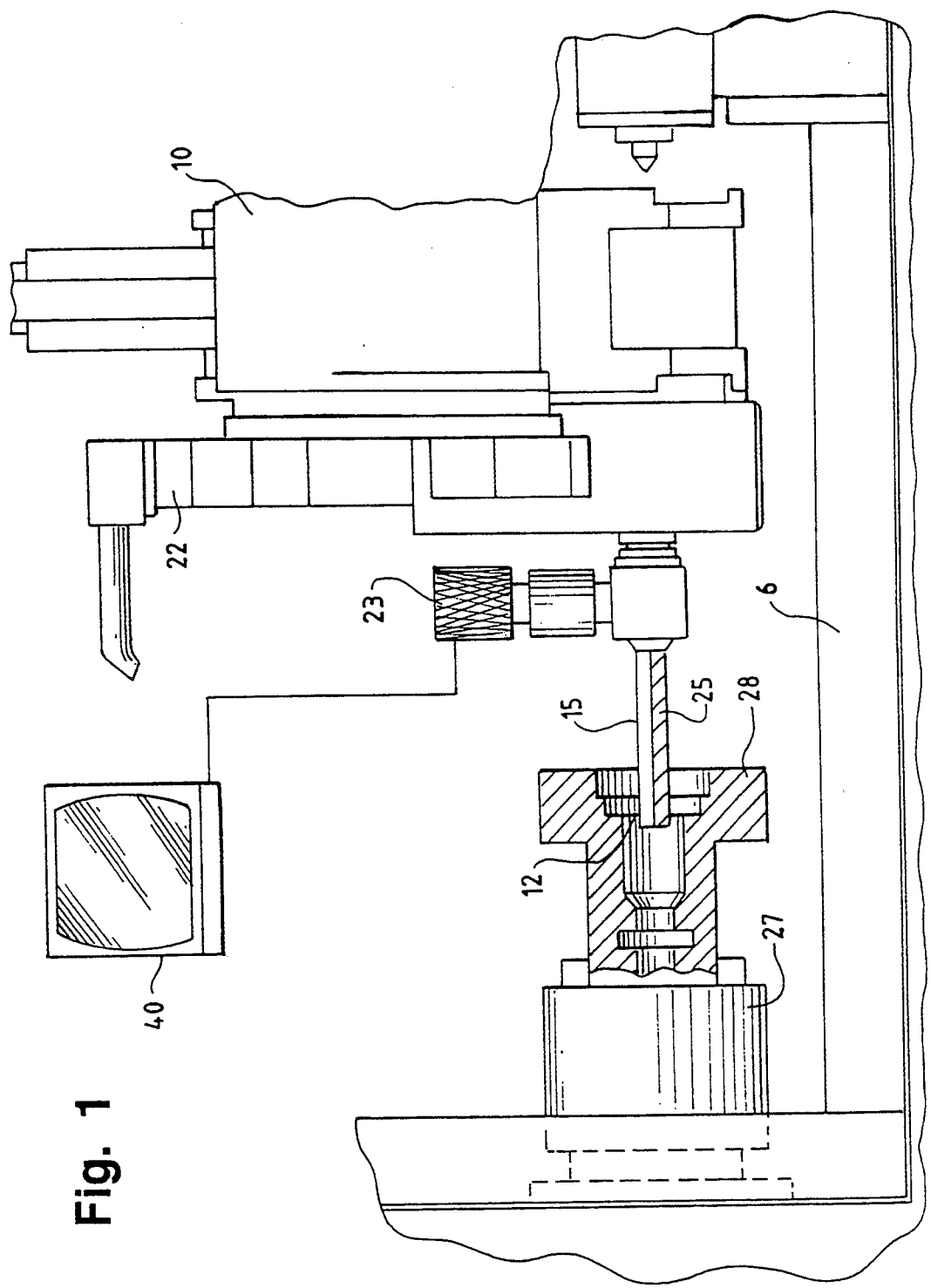
FIG. 1 is a partial cross-sectional side elevation of a lathe containing the invention.

FIG. 1 illustrates schematically a horizontal lathe 10 as a first embodiment of the present invention. In this embodiment a workpiece 28 held in place by chuck 27 is being machined. An electro-optical sensor 12 can be rotated 360° as necessary so as to be in position to view the workpiece 28 being machined on the lathe 6. A light source 25 illuminates the workpiece 28 being so as to provide sufficient light for the camera 23 to take and send its picture to video monitor 40. The light source 25 can be any light source sufficient to provide adequate illumination of the area of the article being machined, such as a fiber optic cable. This cable extends through a tubular section 15 to provide light in front of the article being machined 28. A mirror or prism reflects the light from the workpiece to the camera 23. The visual representation of the article 28 is sent from the camera 23 to the monitor 40. By use of a positional sensor, which is part of the lathe, dimensions on the internal surface of the workpiece 28 can be measured with precision.

Figure 3:
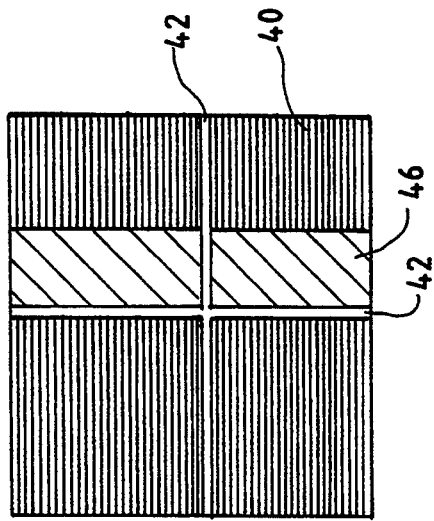
FIGS. 3 and 5 are views showing measurement of a dimension on the video screen.
Figure 5:
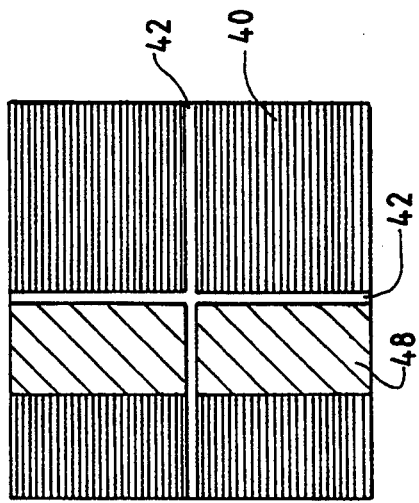
Figure 2:
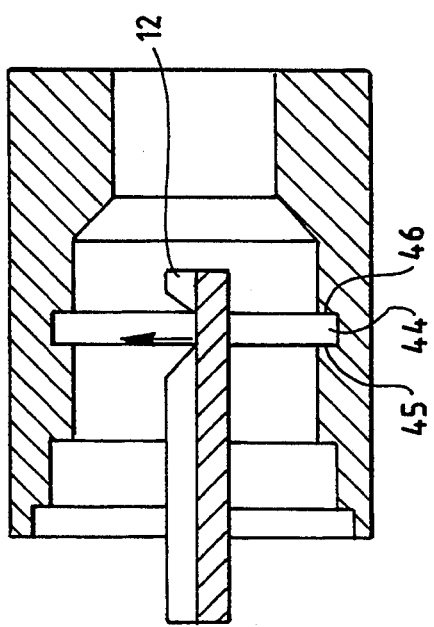
FIGS. 2 and 4 are cross-sectional views showing the operation of the optical sensor.
Figure 4:
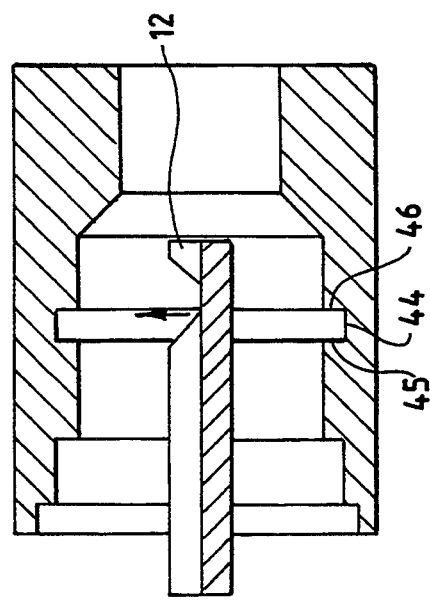
Figure 7:
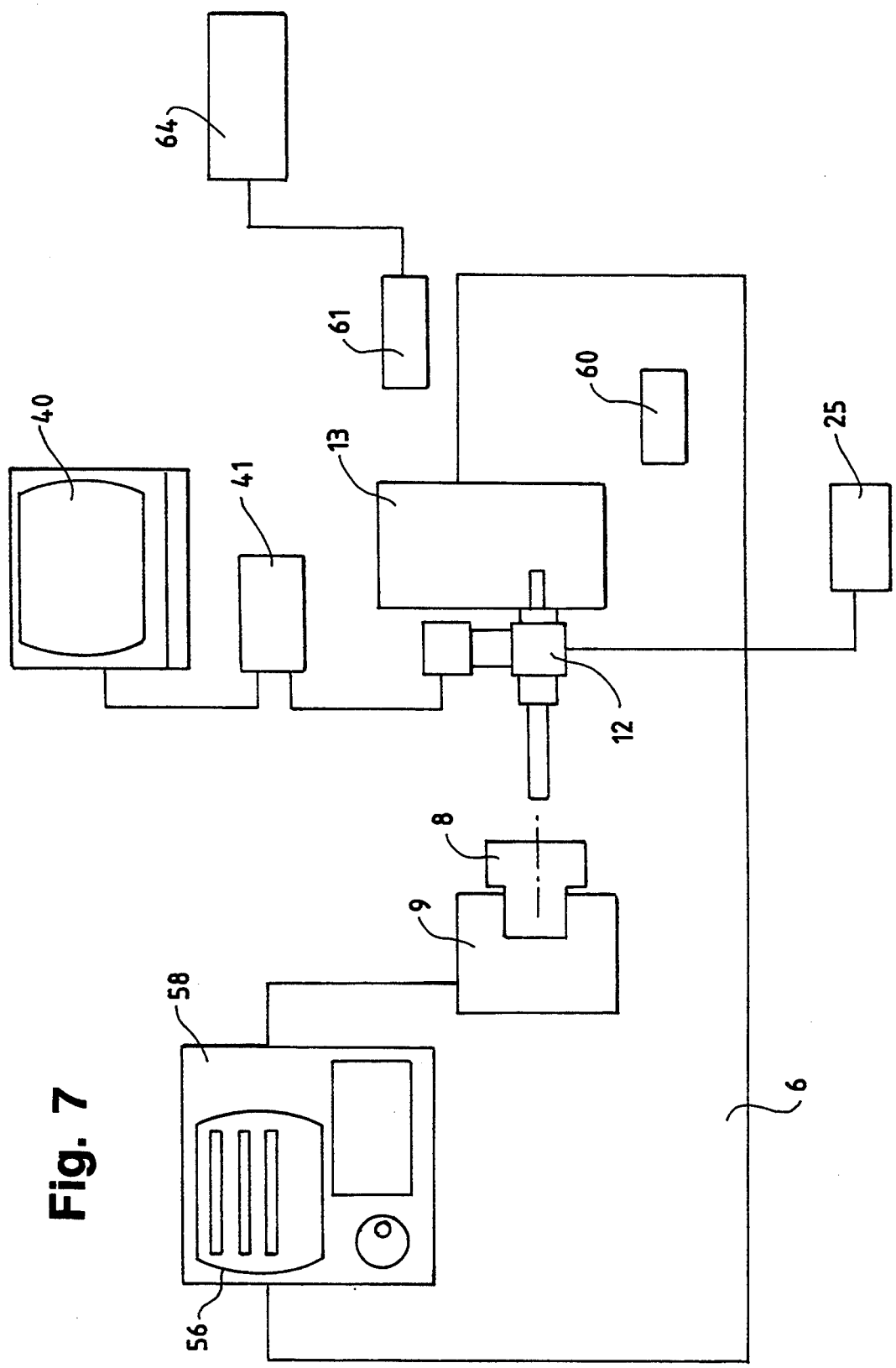
FIG. 7 is a schematic drawing of electro-optical sensor interaction with the machine tool.

FIGS. 2-5 show one method for the measurement of the dimension of a groove 44 on the internal surface of an article being machined. FIGS. 2 and 4 are cross-sectional views of the operation of the optical sensor 12 in the work piece 28. FIGS. 3 and 5 show respectively the visual representation on the video monitor 40 of the workpiece 28 as taken by the optical sensor 12 in the positions shown in FIGS. 2 and 4. The visual representations of the groove are superimposed upon a cross hair 42 electronically generated on the video monitor 40. The operator lines up the first edge 45 of the groove 44 with the vertical line of the cross hair 42. This position is identified as zero on the digital readout display either as a remote or as part of the machine as shown in FIG. 7. FIG. 2 shows the optical sensor in this position in the groove. FIG. 3 shows the visual representation on the video monitor 40 of one edge 45 of the groove 44 lined up with the vertical line of the cross hair 42. Then as shown in FIG. 4, the optical sensor 12 is lined up with the second edge 46 of the groove 44. As shown in FIG. 5, the visual representation of the second edge 46 of the groove 44 is lined up with the vertical line of the cross hair 42. The digital display readout shows the precise width of the groove.

While the foregoing embodiment used a cross hair as the reference means, it should be understood that other reference lines can be displayed on the video monitor 40 for the purpose of measurement of the dimensions of the visual representation taken by the optical sensor 12. These reference forms include but are not limited to squares, spaced vertical lines, cross hairs and other reference lines. As can be seen from the foregoing embodiment, the purpose of the reference lines is a reference point from which accurate measurements can be made of the internal surface. Also the digital readout used in this embodiment is desirable but not necessary. Other forms of determining the measurement can be used in the present invention.

Figure 6:
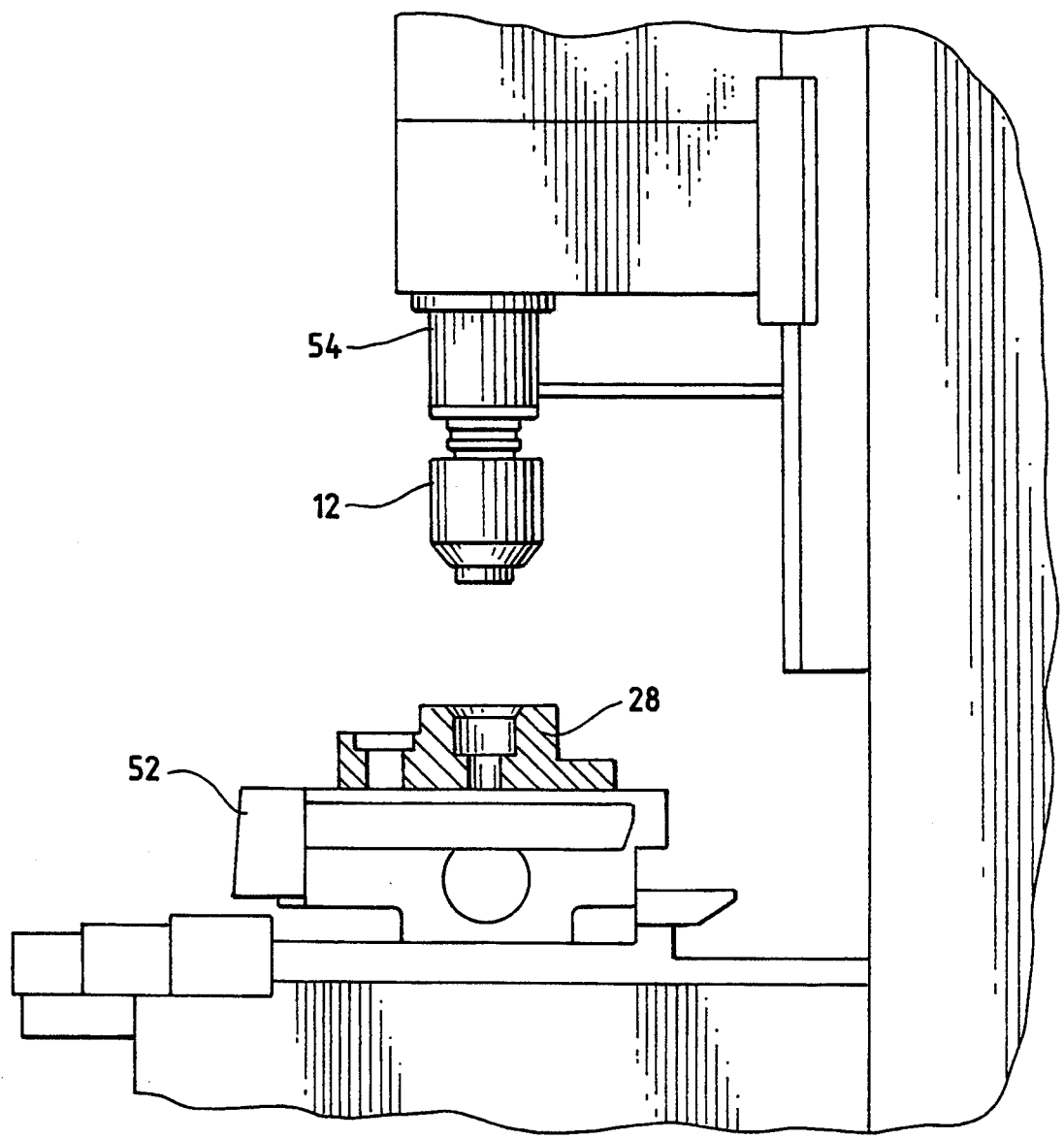
FIG. 6 is a partial cross-sectional side elevation of a milling machine containing the invention.

FIG. 6 represents a second embodiment of the invention; i.e., a milling machine containing the invention. While the milling machine represented in FIG. 6 is vertical, it should be understood that the invention can also be used in a horizontal milling machine. Also the milling machine can be single spindle or multi spindle with the latter being preferred due to the availability of the additional spindles to contain the present invention. In this embodiment, the optical sensor 12, and video camera 23 are mounted to a spindle 54. The article being machined 28 is held in place on a machine table 52. The actual operation of the invention in this embodiment is the same as in the first embodiment previously described wherein the machine tool was a lathe.

The method of measurement of a dimension of an object being machined by the milling machine can be the same as previously described for the measurement of a dimension of an object machined on the lathe. As previously described, FIGS. 2-5 illustrate a method for obtaining precisely this measurement. The previous description of this procedure is also applicable to a visual representation of an internal surfaces of an object being machined on a milling machine.

In particular, the video image of the workpiece is displayed on a video monitor being a part of the conventional machine or mounted separately. An electronically generated pattern, such as a cross hair, is provided on a monitor screen as a reference for image alignment. The workpiece mount or a spindle with electro-optical probe can be manipulated to superimpose the workpiece feature with reference cross hair. The dimensional information is displayed on machine digital readout. By using the software routines stored in machine memory one can perform complicated measurements to be used for set-up corrections.

While the present invention has value in the viewing and measurement of limited access areas, it also is highly useful in the making of volumetric measurements in external surfaces. As with the measurement of internal surfaces, the present invention can measure such volumetric measurements accurately by means of a video monitor, machine tool positional sensors and software.

Referring to FIG. 7, the operation of the invention to measure a dimension of a workpiece 8 in a machine tool 6 set in a workpiece holder 9 can be readily described. An electro-optical sensor probe 12 maintained in a sensor holding device 13 views a segment of the workpiece 8 and its picture is shown on the video monitor 40. Light source 25 allows for sufficient light so that the picture is clear. Electronic character generator 41 transmits a reference means such as a cross hair 42 to the video monitor 40 for the accurate measurement of a dimension of the workpiece 8. The digital measurement determination can be shown on the machine tool display 56. Various machine tool controls such as a numerical control 58, an internal position sensor 60, an external position sensor 61, an external position readout device 64 can also be present to provide accurate control of the machining and measurement operations.

Figure 8:
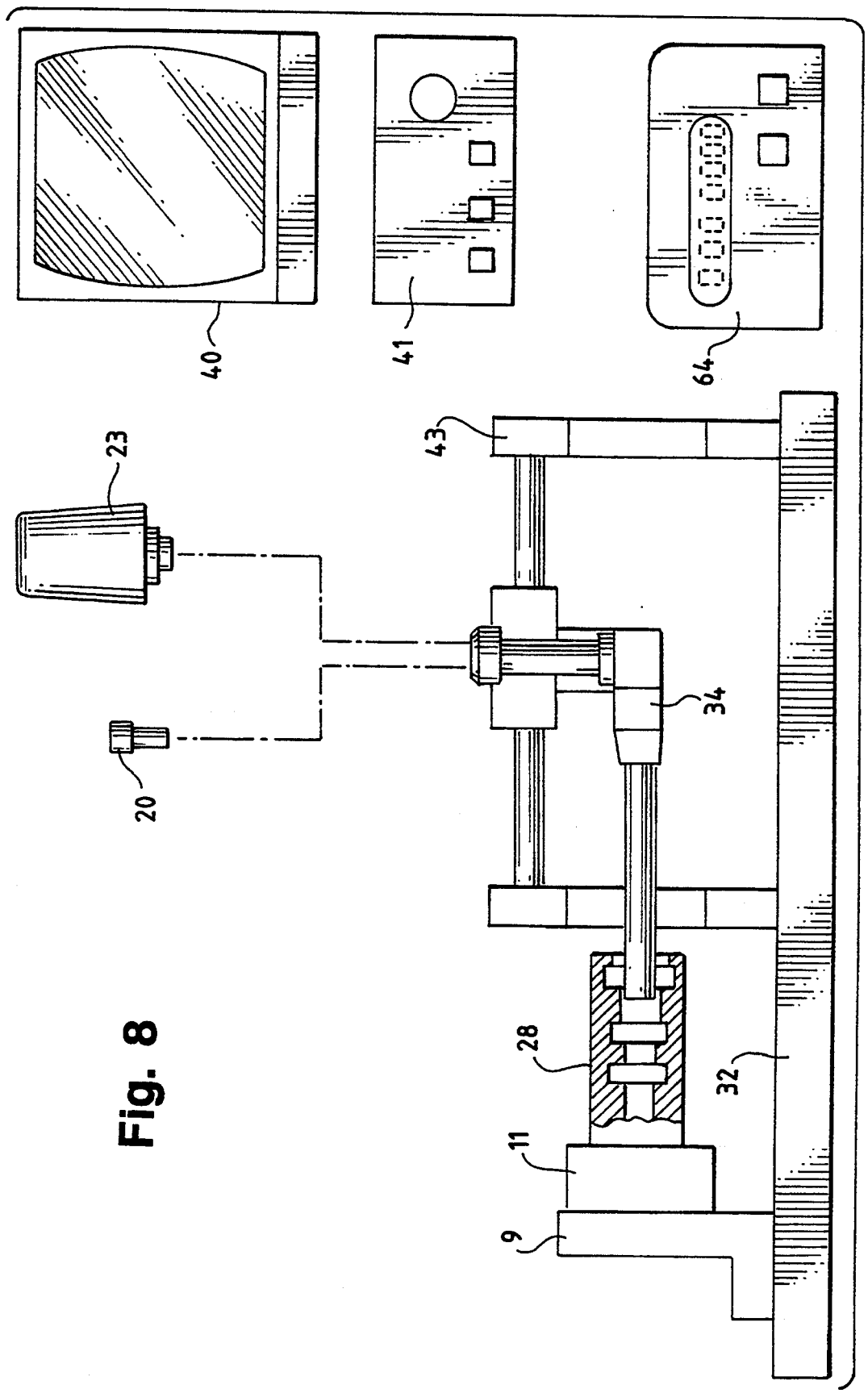
FIG. 8 is a schematic drawing of the stand alone unit of the present invention.

FIG. 8 represents a third embodiment of the present invention, a stand alone unit. Referring to FIG. 8, the stand alone unit is secured firmly to a base plate 32. The workpiece 28 is held in place by a workpiece holder 9. A positioning mechanism 11 permits the operator to position the workpiece 8 in the desired position. Borescope 34 includes a light source, an electro-optical sensor, mirror or prism reflecting the visual representation of an internal area of the workpiece 28 to be viewed by a video camera 23 or eyepiece 20. A positional sensor 43 allows for obtaining linear measurements of the internal area of the workpiece 28 being viewed by the borescope 34.

As discussed previously, FIGS. 2-5 demonstrate a method of measurement of certain areas of the workpiece 28. The cross hair generator 41 can be used to display reference lines on the video monitor 40. The digital readout 64 provides one procedure for displaying precise areas of the workpiece. This embodiment of the present invention is of importance as it contains all of the present invention in a single work center.

It will be understood that the embodiments of the present invention have been described as merely illustrative of a few of the applications of the principles of the present invention. Numerous modifications may be made by those skilled in the art without departing from the true spirit and scope of the invention.

We claim:

1. In a machine tool comprising a main frame, said main frame having means for holding a workpiece, the improvement comprising:

means operatively associated with said main frame for measuring at least one dimension of at least a portion of a workpiece held by said means for holding, said means operatively associated with said main frame for measuring at least one dimension comprising:

a rotatable, electro-optical sensor operatively associated with said main frame;

means for positioning said rotatable, electro-optical sensor in operative position with said means for holding in order to measure an internal dimension of a workpiece held by said means for holding;

light-producing means for directing light upon a surface to be measured of the workpiece held by said means for holding, said light-producing means producing light for providing ample illumination on at least a portion of a workpiece the dimension of which is to be measured, in order that said rotatable, electro-optical sensor properly detects the light;

means operatively coupled to said rotatable, electro-optical sensor for receiving information detected thereby;

monitor means operatively coupled to said means operatively coupled to said rotatable, electro-optical sensor for displaying a visual representation of the surface being measured; and means for producing calibration marks on said monitor means, in order to measure the visual representation of the surface being measured;

said means operatively coupled to said rotatable, electro-optical sensor for receiving information detected thereby comprising a video camera;

and a workpiece held by said means for holding; said workpiece having an interior surface that is to be measured; said rotatable, electro-optical sensor being located in said workpiece in close juxtaposition to said interior surface, said electro-optical sensor being spaced from, and out of contact with, said interior surface.

2. The machine tool according to claim 1, wherein said light-producing means comprises a fiber-optic cable.

3. The machine tool according to claim 1, wherein said main frame comprises at least one tool holder, said means operatively associated with said main frame for measuring at least one dimension being mounted by said at least one tool holder.

* * * * *